United States Patent
Surawski et al.

(10) Patent No.: US 12,332,152 B2
(45) Date of Patent: Jun. 17, 2025

(54) METHODS OF OBTAINING A BIOLOGICAL SAMPLE REPRESENTATIVE OF A PASSENGER CABIN ON AN AIRCRAFT USING AN AIR CYCLONIC COLLECTOR VIA A CABIN EXHAUST VALVE

(71) Applicant: B/E AEROSPACE, INC., Winston Salem, NC (US)

(72) Inventors: Eric Surawski, Hebron, CT (US); Kenneth Crawford, Manchester, CT (US); Donald E. Army, Enfield, CT (US); Kevin P. Walsh, Enfield, CT (US); Brian R. Shea, Windsor, CT (US); Tony Ho, Glastonbury, CT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 439 days.

(21) Appl. No.: 17/518,325

(22) Filed: Nov. 3, 2021

(65) Prior Publication Data

US 2022/0057303 A1 Feb. 24, 2022

Related U.S. Application Data

(60) Provisional application No. 63/114,330, filed on Nov. 16, 2020, provisional application No. 63/114,339, filed on Nov. 16, 2020, provisional application No. 63/114,350, filed on Nov. 16, 2020, provisional application No. 63/114,064, filed on Nov. 16, 2020, provisional application No. 63/114,366, filed on Nov. 16, 2020, provisional application No. 63/114,157, filed on Nov. 16, 2020, provisional application No.
(Continued)

(51) Int. Cl.
  *G01N 1/22* (2006.01)
  *B64D 13/00* (2006.01)
  *G01N 1/40* (2006.01)

(52) U.S. Cl.
  CPC .......... *G01N 1/2247* (2013.01); *B64D 13/00* (2013.01); *G01N 1/2205* (2013.01); *G01N 1/2273* (2013.01); *G01N 1/40* (2013.01); *G01N 2800/26* (2013.01)

(58) Field of Classification Search
  CPC .. G01N 1/2247; G01N 1/2205; G01N 1/2273; G01N 1/40; B64D 13/00
  See application file for complete search history.

(56) References Cited

U.S. PATENT DOCUMENTS 4,963,167 A * 10/1990 Young ............... G01N 1/2205
                                                     73/863.25
6,468,330 B1   10/2002 Irving et al.
(Continued)

OTHER PUBLICATIONS

Extended European Search Report for European Patent Application No. EP21208622.7, dated Apr. 14, 2022.
(Continued)

*Primary Examiner* — David Z Huang
(74) *Attorney, Agent, or Firm* — SNELL & WILMER L.L.P.

(57) ABSTRACT

A method of monitoring aircraft including removing a conical collector through a cabin exhaust valve of the aircraft wherein ambient cabin air has been driven from the cabin over a reagent fluid within the conical collector in order to collect a representative sample of the cabin air within the reagent fluid.

7 Claims, 1 Drawing Sheet

Related U.S. Application Data

63/114,386, filed on Nov. 16, 2020, provisional application No. 63/114,400, filed on Nov. 16, 2020.

(56) References Cited

U.S. PATENT DOCUMENTS

| | | | |
|---|---|---|---|
| 7,390,339 B1 | 6/2008 | Warrick et al. | |
| 2004/0038385 A1* | 2/2004 | Langlois | G01N 1/2202 435/287.1 |
| 2009/0035770 A1 | 2/2009 | Mathies et al. | |
| 2011/0159596 A1 | 6/2011 | Keinan et al. | |
| 2011/0203931 A1 | 8/2011 | Novosselov et al. | |
| 2012/0122075 A1 | 5/2012 | Call et al. | |
| 2014/0370519 A1 | 12/2014 | Vangbo et al. | |
| 2016/0025603 A1 | 1/2016 | Kindt et al. | |
| 2017/0009290 A1 | 1/2017 | Ahmad et al. | |
| 2019/0002874 A1* | 1/2019 | Belgrader | C12Q 1/6865 |
| 2019/0046985 A1 | 2/2019 | Kang et al. | |
| 2021/0316868 A1* | 10/2021 | Estable | B64D 13/02 |

OTHER PUBLICATIONS

Korves T.M., et al., "Bacterial communities in commercial aircraft high-efficiency particulate air (HEPA) filters assessed by PhyloChip analysis"; Indoor Air, vol. 23, No. 1, Jun. 8, 2012 (Jun. 8, 2012), pp. 50-61, XP055907740, DK; ISSN: 0905-6947, DOI: 10.1111/j.1600-0668.2012.00787.x; sections "Practical Implications"; "Materials and methods", "Aircraft and outdoor air samples"; first and second paragraph; "PCR amplification of 16S rRNA genes".
Extended European Search Report for European Patent Application No. EP 21208632.6, dated Apr. 8, 2022.
Communication from the EPO issued in Application No. 21208632.6 dated Nov. 8, 2023.

* cited by examiner

```
┌─────────────────┐     ┌─────────────────┐     ┌─────────────────┐     ┌─────────────────┐
│ 102             │     │ 104             │     │ 106             │     │ 108             │
│ Driving air     │─────│ removing the    │─────│ Collecting a    │─────│ Performing a    │
│ over a reagent  │     │ conical         │     │ representative  │     │ PCR test on the │
│ fluid within a  │     │ collector       │     │ sample of the   │     │ representative  │
│ conical         │     │ through a cabin │     │ reagent fluid   │     │ sample          │
│ collector       │     │

METHODS OF OBTAINING A BIOLOGICAL SAMPLE REPRESENTATIVE OF A PASSENGER CABIN ON AN AIRCRAFT USING AN AIR CYCLONIC COLLECTOR VIA A CABIN EXHAUST VALVE

CROSS-REFERENCE TO RELATED APPLICATION

The following application claims priority to U.S. Provisional Patent Applications with the following Ser. Nos. 63/114,330, 63/114,339, 63/114,350, 63/114,400, 63,114,064, 63/114,157, 63/114,386, 63/114,366 all filed on Nov. 16, 2020; and Patent Application Ser. No. 63/043,414 filed on Jun. 24, 2020 the contents of which are herein incorporated by reference in their entirety.

BACKGROUND OF THE INVENTION

1. Field of the Invention

The present application is related to a system and method used collect a representative air sample of an aircraft, more specifically to a method and systems for collecting a biological sample on an aircraft.

2. Description of Related Art

The spread progression of SARS-CoV-2 around the world has risen a red flag: Economic economic globalization creates systemic risks. As trade, finance, travel, cyber and other networks grow in scale and interact, they become more complex and unstable. The transporters of the goods of the global economy, such as major airport hubs, are also spreaders of the pathogens. The 2008 global financial crisis provided a dramatic example of how contagions could spread from the US to global markets overnight. So too has the rapid spread of cyber viruses. In health, rising life expectancy and success in preventing a repeat of the devastating influenza pandemic of 1918, which infected about one-third of the world's population and killed as many as 50 m people, has created a false sense of security. But the world is now more interdependent. For example, China represents almost one-fifth of global output, is integral to global supply chains, and its tourists spend over $260 billion annually. The CovidCOVID-19CoVID-19 pandemic shed light on the need for better monitoring, detecting, and isolating ill passengers, specifically due to the havoc that was wreaked detrimental impact on the global economy, specifically air travel due to closed borders, movement restrictions, and testing requirements.

However, the COVIDCoVID-19 pandemic the air travel industry has proven that air travel can be safe and that aircraft cabins have a well-managed airflow that inhibits minimize the risk for transmission of virus, and that being seated onboard an aircraft is safer than shopping in large stores. Governments and other authorities need to assume that aircraft are contaminated until proven "clean", as 25% of COVID-19 cases are asymptomatic or pre-symptomatic; but still contagious. Thus, if borders shutdown and a drastic reduction in international travel global passenger travel is greatly reduced. To date travelers and governments have relied on individual diagnostic tests. The uncertainty of the results has reduced people's inclination to travel and subsequent airline inclination to maintain routes.

Accordingly, conventional systems and methods of monitoring infections has not lived up to requirements of the fast paced modern world. Thus, there is still a need in the art for an improved on-board virus and pathogen detection system, and method of use. The present disclosure provides a solution for this need.

SUMMARY

A method of monitoring aircraft air includes removing a conical collector through a cabin exhaust valve of the aircraft wherein ambient cabin air has been driven from the cabin over a reagent fluid within the conical collector in order to collect a representative sample within the reagent fluid. Ambient cabin air can be driven by an air circulation machine. The method can include extracting and purifying the reagent fluid by passing the concentrated reagent fluid through silica columns, and by extracting and purifying by passing the concentrated reagent fluid through magnetized beads. Concentrating the reagent fluid can include using a concentration pipette. The conical collector can be removed by hand, without requiring any special tooling or machinery to access the collector, since the conical collector is open to ambient air.

A system for monitoring aircraft air including producing the method described above is also disclosed. The system includes a HEPA filter positioned in a recirculation flow path of an aircraft configured to collect flow path air, and at least one removable strip attached to the strip for removing after each flight. The inlet of the conical collector includes a smaller diameter than the outlet of the conical collector. The conical main body can taper down away from the inlet. The particulate samples include droplets exhaled from passengers throughout a duration of a flight. The collector can be mounted within a mounting slot in the outlet flow path upstream from the outflow valve, wherein the collector is positioned within the mounting slot. The collector can be configured and adapted to be removed from a mounting slot of the collector for testing of the collected sample.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a block diagram of a method of removing a conical collector according to the disclosure.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an exemplary embodiment of a method in accordance with the disclosure is shown in FIG. 1 and is designated generally by reference character 100. The methods and system described below can be used to collect a bulk sample, representative of each passenger on the aircraft and to test it to provide a bulk screening of the aircraft prior to arrival of the aircraft at a destination, and quickly turned around for a fast dispatch of the next flight.

FIG. 1 shows a method 100 for monitoring aircraft air includes removing a conical collector through a cabin exhaust valve of the aircraft wherein ambient cabin air has been driven from the cabin over a reagent fluid within the conical collector in order to collect a representative sample within the reagent fluid. Ambient cabin air can be driven 102 by an air circulation machine. The method includes extracting and purifying 104 the reagent fluid by passing the concentrated reagent fluid through silica columns, and by extracting and purifying by passing the concentrated reagent fluid through magnetized beads. Concentrating the reagent fluid can include using a concentration pipette.

The fluid can be collected at the bottom of the conical collector or be smeared on the inner surface of the conical collector. The conical collector can be removed by hand, without requiring any special tooling or machinery to access the collector. The conical collector is open to ambient air, and can be removed by hand through outflow valve.

A system for enabling the method described above includes a HEPA filter positioned in a recirculation flow path of an aircraft configured to collect flow path air, and at least one removable strip attached to the strip for removing after each flight. The inlet of the conical collector includes a smaller diameter than the outlet of the conical collector. The conical main body can taper down away from the inlet. The particulate samples include droplets exhaled from passengers throughout a duration of a flight. The collector can be mounted within a mounting slot in the outlet flow path upstream from the outflow valve, wherein the collector is positioned within the mounting slot. The collector can be configured and adapted to be removed from a mounting slot of the collector for testing of the collected sample and a new collector to be promptly placed within the mounting slot for the next flight.

The methods and systems of the present disclosure, as described above and shown in the drawings, provide for improved collector changeover and improved data collection of air aboard an aircraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of monitoring aircraft air comprising:

removing a conical collector through a cabin exhaust valve of the aircraft, wherein ambient cabin air has been driven from the cabin over a reagent fluid within the conical collector in order to collect a representative sample within the reagent fluid to monitor the aircraft air and wherein the representative sample is at least one of collected at a bottom of the conical collector or smeared on the inner surface of the conical collector.

2. The method of claim 1, wherein ambient cabin air is driven by an air circulation machine.

3. The method of claim 1, further comprising extracting and purifying the reagent fluid including passing the reagent fluid through silica columns.

4. The method of claim 3, wherein extracting and purifying includes passing the reagent fluid through magnetized beads.

5. The method of claim 3, further comprising concentrating the reagent fluid includes using a concentration pipette.

6. The method of claim 3, wherein the conical collector is removed by hand.

7. The method of claim 3, wherein the conical collector is open to ambient air.

* * * * *